Figure 10:
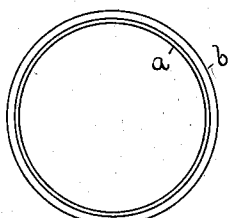

No. 885,796. PATENTED APR. 28, 1908.
H. C. SHEARMAN.
PNEUMATIC AND OTHER TIRES.
APPLICATION FILED JUNE 13, 1903.
4 SHEETS—SHEET 1.
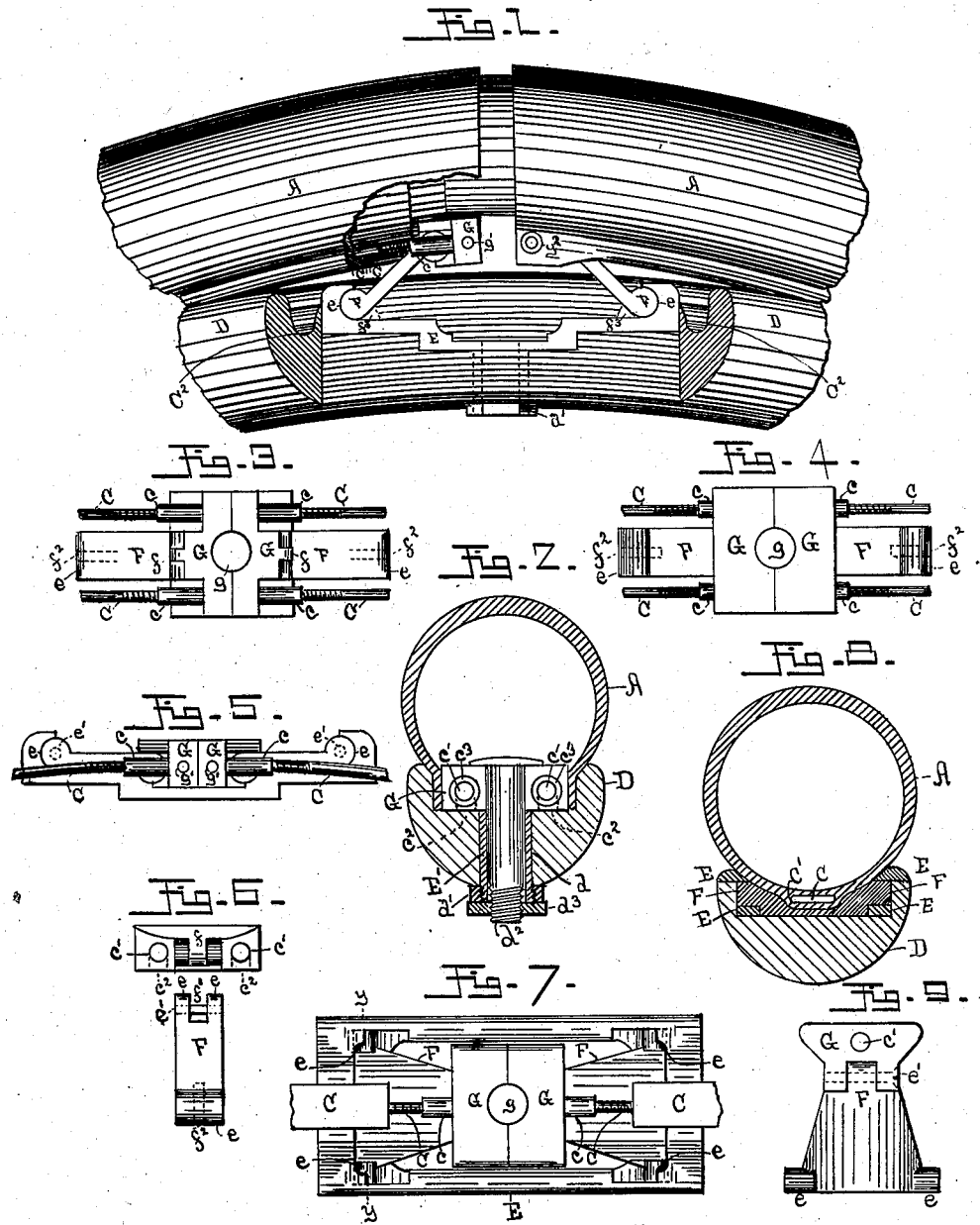
Witnesses:
Benjamin Baker.
Nathaniel S. Bishop.
Inventor:
Henry Clifton Shearman.

No. 885,796. PATENTED APR. 28, 1908.
H. C. SHEARMAN.
PNEUMATIC AND OTHER TIRES.
APPLICATION FILED JUNE 13, 1903.

4 SHEETS—SHEET 2.

Witnesses:
Benjamin Baker
Nathaniel S. Bishop

Inventor:
Henry Clifton Shearman

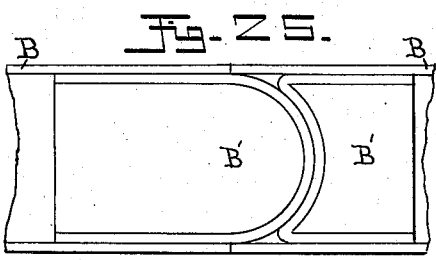
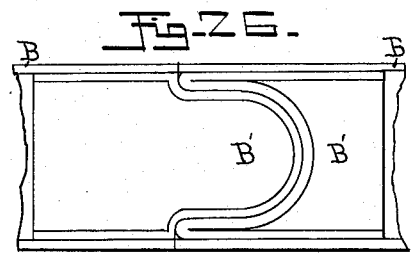
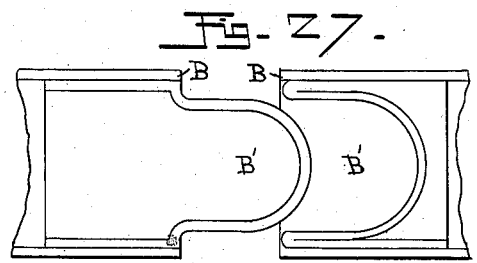
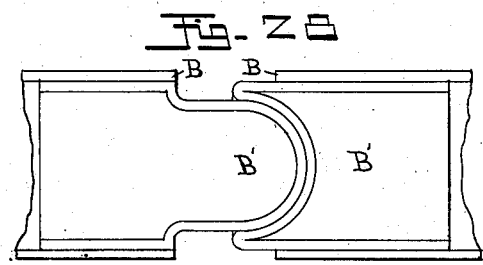
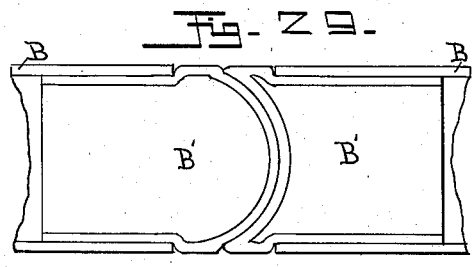
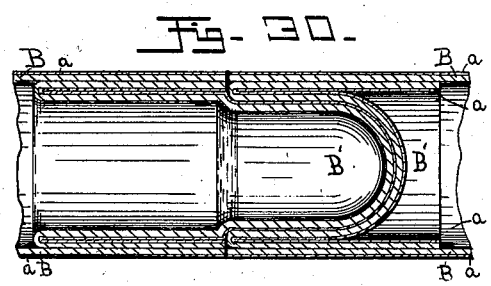
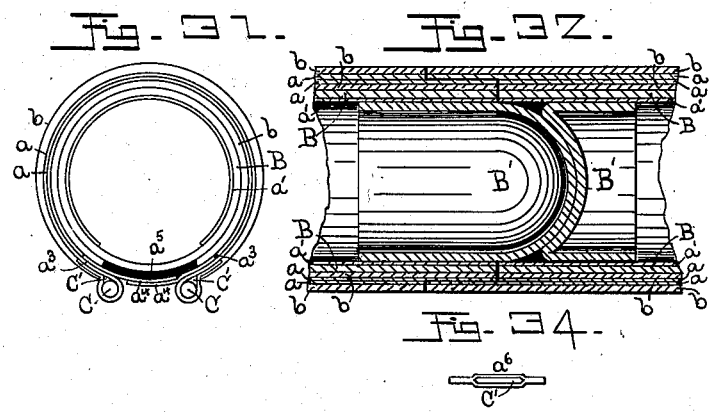
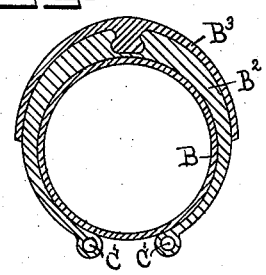

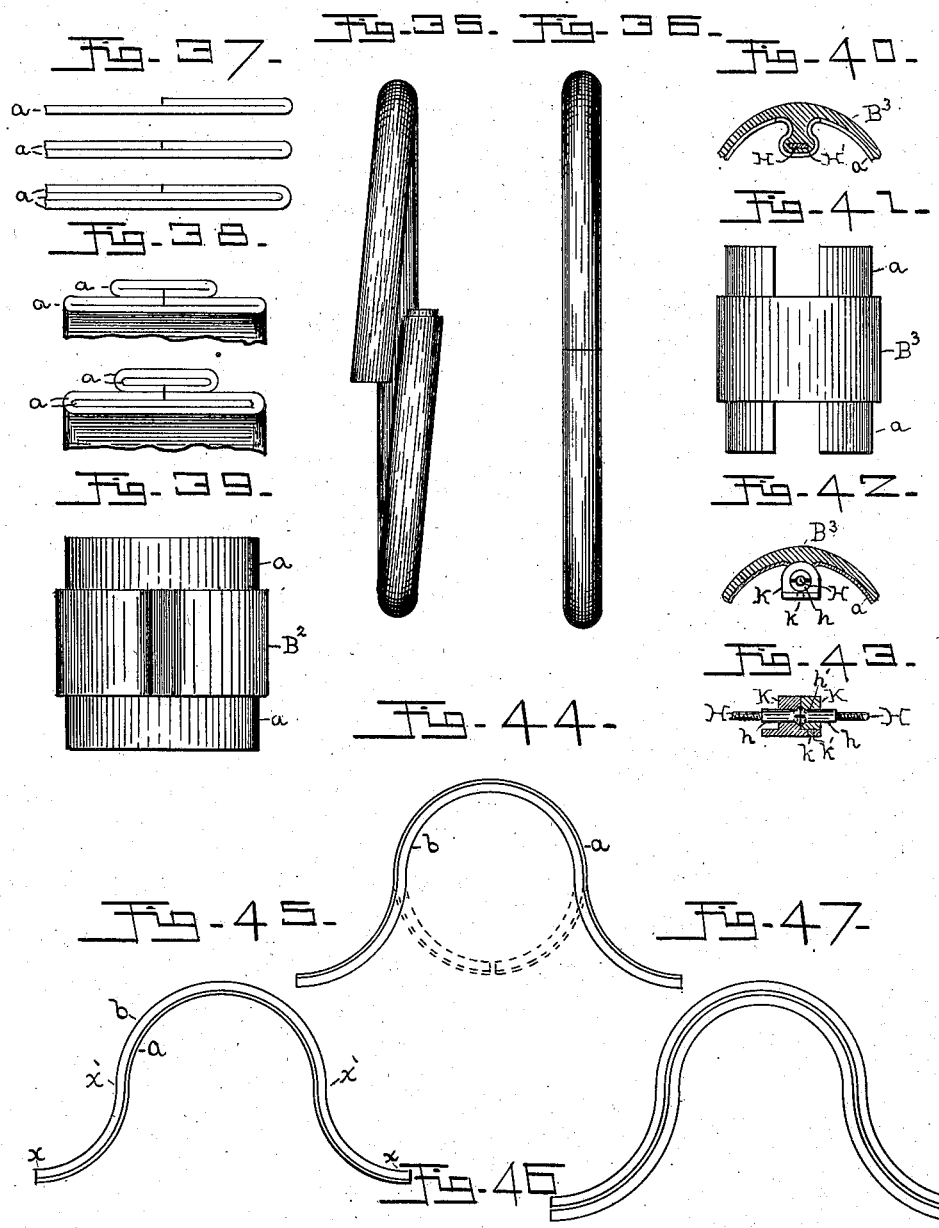

UNITED STATES PATENT OFFICE.

HENRY CLIFTON SHEARMAN, OF PROVIDENCE, RHODE ISLAND.

PNEUMATIC AND OTHER TIRES.

No. 885,796.      Specification of Letters Patent.      Patented April 28, 1908.

Application filed June 13, 1903. Serial No. 161,287.

*To all whom it may concern:*

Be it known that I, HENRY CLIFTON SHEARMAN, of the city and county of Providence and State of Rhode Island, have invented certain new and useful Improvements in Pneumatic and other Tires, of which the following is a specification.

The object of my invention is to produce a pneumatic tire which is with difficulty punctured and transversely cut, and which is so constructed that when such punctures or transverse cuts do occur the tendency is for them to automatically close and prevent the leakage of air; and, further, such a construction as will admit of the speedy removal of a badly mutilated portion of tire and the substitution of a repair section therefor, besides allowing various modifications and changes in the way of repair and additions of improvements as hereinafter set forth; and my invention further has for its object the use of a detachable tread-band; means for compacting its material and regulating its length; an adaptation of a tire to receive said tread-band and its puncture-proof lining springs; means for preventing the slipping of tire on icy ground; means for sealing the ends of a pneumatic tube and regulating the length of same, and means for facilitating the adjustment and removal of tire and tightening and securing it to rim of wheel.

My invention consists in certain features of construction, arrangement and combination of parts as hereinafter fully set forth and specifically described in the claims.

I have devised the herein shown and described tire as a preferred form under which to present the interrelationship of the various features of my invention as applied to a tire. Yet, many of the features of my invention are not confined to a special class of tire, but may be used on tires in general; and some features consist of such a novel and simple arrangement and combination of layers of rubber, or other suitable substance, and layers of textile fabric that their use is not limited to tires but is of value when they are embodied in hose piping, rubber tubing and other vessels wherein a layer of textile fabric in union with a layer of compacted rubber may be made an integral part to secure the puncture closing feature.

Before presenting the detailed description of my improved tire, with the assistance of the drawings, I deem it advisable for a more thorough and exact understanding of the drawings and claims to give a general outline of the scope possessed by the automatic puncture-closing feature and the numerous distinct methods of securing and intensifying this function in the various layers of the same tire—including tire body, tread recess, tread band and inner tube.

Although a single thickness of canvas or other suitable material, having transverse threads, may constitute the body of my improved tire, and, in connection with a compacted layer of rubber, perform all the functions relating to resistance to puncture, self closing punctures and transverse cuts, and neat sectional repair insertions, I prefer to make use of several layers or thicknesses of the same, or of differing material integrally united by cement, by layers of rubber vulcanized or fused in contact with the thicknesses of fabric chosen, or, other means whereby a certain elasticity is imparted to the mass of crossed threads or fibers as a whole—the threads in different layers preferably extending in different directions in adjacent thicknesses to assist in mutually supporting crossed threads against incision and assist in restraining the tendency of crossed threads, when obliquely cut, to bulge under the pressure of inflation.

The construction of the tire admits of the material forming the body of the tire, tread recess and detachable tread-band being of one piece—capable of being transversely severed at right angles to the tire; or, by the use of the detachable rim bands, it may be made up in sections; or, it may itself be a section of a band or tube molded in the form of a tier of spiral loops.

By the use of the loop construction of the tire (with normally passing ends) on a wheel rim of greater diameter than that of the loop, and whereon the ends are made to unite, the elastic material at tread is abnormally compressed, or compacted, longitudinally on inflation as compared with its normal relationship to the textile material in the normal loop form. In addition to this abnormal use of the normal relationship of elastic material to the textile fabric, I make use of a permanent abnormal relationship of elastic layers to layers of, preferably, non-stretching fabric (*i. e.* a fabric non-stretching in directions at right angles at the same time, as would be a knitted fabric, but which may, and preferably does, include a bias cut band) to secure the permanent compacted feature of a layer of elastic material which shall possess the automatic puncture closing function even while the tubular curves are reversed and the fabric with which the elastic material is made integral is stretched in one direction.

In the loop construction, this normal relationship of a layer of rubber to a layer of textile fabric may be effected by 1. The integral union by cement, vulcanizing, fusing or other means, of a layer or tube of rubber and a layer or tube of textile material—each possessing separately the same normal loop form required in their union to constitute the desired loop construction.

2. The integral union of one or more layers of textile fabric with cement or with an impregnation of a solution of rubber, or other suitable elastic substance, while said fabric is stretched, molded or otherwise formed in the shape of a loop of a coil.

3. The integral union of one or more layers of textile fabric possessing the form of a loop of a coil and a layer or tube of rubber stretched, cemented and vulcanized, or fused therewith while held, molded or inflated in its normal loop form.

The permanent compaction of material of tire I secure by different specific means, yet each may be a step in one continuous process in the tire's construction, as exemplified in the treatment of the same, or of a different layer, and a reverse use in the same tire of a layer so treated, or, the use of a layer treated in a reverse manner. They include:

1. The integral union of a layer of textile fabric (which has preferably been impregnated with a solution of rubber and vulcanized) with a layer of rubber, which is rolled or curved about it without stretching, forming an outer covering which is preferably vulcanized while thus curved; and the integral union, preferably by cement, of the surface of textile fabric remaining uncovered with a second layer of rubber which is curved or rolled about it without stretching—the curve being the reverse of former curve—to form a layer of textile fabric provided with compacted rubber surfaces.

2. The integral union by cement, or other means, along the inner tread portion of the tire of a layer of textile fabric having a lining of rubber, which was normally integrally united and molded therewith as an outer covering possessing the approximate curves of the tread of the tire, but both fabric and rubber layer made to assume curves, in relation to the tire, the reverse of their normal molded form to secure a compacted inner tread rubber lining.

3. The integral union by cement, or other means, of a band or tube of textile material and a layer or tube of textile fabric having a lining of rubber, which was normally integrally united and molded therewith as an outer covering, possessing the approximate curves of said band or tube but both fabric and rubber made to assume curves in relation to said band or tube the reverse of their normal molded form to secure a compacted rubber lining to said band or tube.

4. The integral union by cement, vulcanizing, or other means, of a band or tube of textile material of free-ended, loop or annular form, open or closed longitudinally, having a compacted lining of rubber, which was normally made integral with said band or tube as an outer covering, and a layer of rubber or other suitable elastic substance, of less transverse circumferential curve than said band or tube, to form an outer covering to said band or tube which shall be compacted.

As any tendency in a layer of material to resist puncture, or, to close it when made, is a most desirable feature in a tire, I employ said compacted layer both as an inner surface lining and as an outer covering, and extend its use to the tread recess and detachable tread-band, while even the inner tube is made with a compacted tread portion which is puncture closing, even when inflated away from the casing, if the puncture does not sever the fibers of its integral fabric. Thus it is obvious that this feature of my invention is equally applicable to hose piping and other tubing, as well as to the surface of any vessel, wherein either a puncture closing lining or covering is desirable, to retain or exclude liquids or gases throughout the entire surface or only in portions of same.

Figure 11:
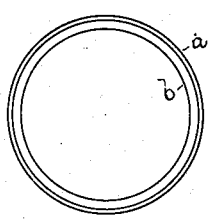
Figure 12:
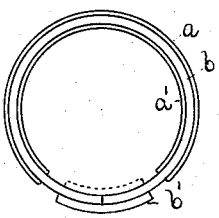
Figure 13:
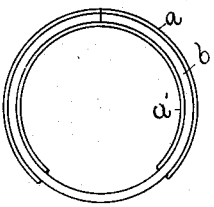
Figure 14:
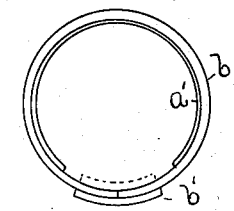
Figure 15:
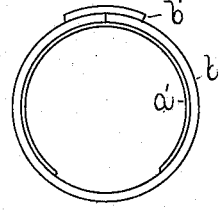
Figure 16:
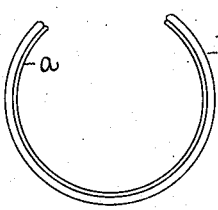
Figure 17:
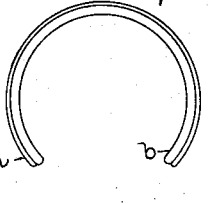
Figure 18:
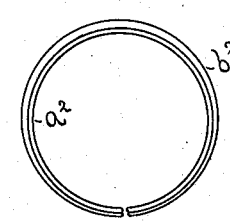
Figure 19:
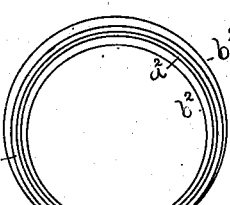
Figure 20:
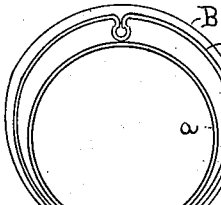
Figure 21:
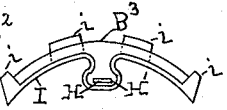
Figure 22:
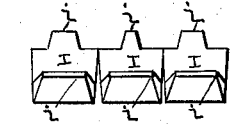
Figure 23:
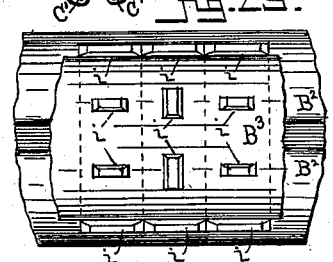
Figure 24:
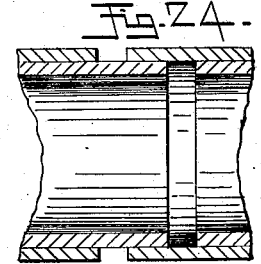

In the drawings, Figure 1 shows the lever attaching device in connection with a tire casing, open at rim, before being forced to its seat on wheel rim; a section of the rim of wheel shown cut diagonally to bed-plate and removed, and a portion of end of casing also removed to show attachment of rim bands to lever device. Fig. 2 shows a transverse section of wheel rim showing end-plate of lever device with its attachments in place on wheel rim. Fig. 3 shows under view of lever end-plates and attachments when closed. Fig. 4 shows an upper view of same. Fig. 5 shows a side view of lever device and the relative positions of lever bearings to secure automatic fastening when in contact with lever bed-plate. Fig. 6 shows a rear view of an end-plate and means to secure a rocking bearing contact of lever with same. Fig. 7 shows a view of upper surface of a modified form of lever device adapted to the use of a single band. In this modification, the bed-plate E is approximately of the width of wheel rim and consists of a frame adapted to be sunk in the bed of a concave wheel rim, and flush with it, whose sides conform in curve to that of edges of wheel rim and whose ends to that of the concavity of rim. This construction allows the lever ends to have a bearing within a thickened portion on each side of bed-plate above the curve of rim-band when tire is in place, owing to the upper surface of both bed-plate and levers being made to conform to the concavity of wheel rim, and levers and end-plates being allowed to pass below said surface of bed-plate. Fig. 8 shows a transverse section of a tire and wheel rim provided with same (at line y—y of Fig. 7) and shows center of bearing above that of band. Fig. 9 shows a rear view of an end-plate shown in Fig. 7 with lever pivoted to end-plate. Fig. 10 shows a transverse section of a tube consisting of an outer tube of rubber integrally united, preferably by vulcanizing, to an inner textile layer, shown in the form of a tube, while said textile layer is stretched. Fig. 11 shows the tube reversed; one end having been turned within and drawn through the tube presenting a thickened and compacted lining to textile layer. Fig. 12 shows, in addition to Fig. 11, an inner lining of textile material integrally united preferably by cement while stretched to compacted tube of rubber and, in addition, that the tube of rubber may be severed between the edges of textile layer, if an open tube, to facilitate insertion and union of lining and the cut closed by a strip of rubber made integral with rubber tube. Fig. 13 shows a modification of Fig. 12, the cut being made through the first layer of textile material as well as rubber tube, the lining fabric while stretched made integral, preferably by cement with compacted rubber, the edges of cut being drawn together to abut. Fig. 14 same as Fig. 12 with outer layer of fabric removed. Fig. 15 same as Fig. 13 with outer layer of fabric removed and a strip of suitable material cemented over abutting edges of cut. Fig. 16 shows a transverse outline of a band, or an open tube, consisting of an open tube of rubber and an inner layer of textile fabric made integral therewith, while stretched and formed, preferably by vulcanizing. Fig. 17 shows the open tube of Fig. 16 reversed, presenting, as turned for use, a thickened compacted lining of rubber to textile layer. Fig. 18 shows an open tube of textile fabric with integral covering of rubber thicker at tread portion. Fig. 19 shows the integral union of tube shown in Fig. 18 with a similar tube provided with an inclosed portion forming a sheath at each edge of textile layer—the inner open tube being reversed as to its curves— thus presenting a compacted rubber lining to the compound tube thus formed; which tube, used as a tire, with ends of each tube adapted to abut as shown in Fig. 24, produces a tire casing which is reversible at will; and, by use of a slightly smaller transverse curve to the outer tube, and the loop form to both, the reversible tire casing thus formed (one layer of fabric possessing threads running transversely) will possess the puncture closing function of transverse cuts as well as punctures, and equally as well when reversed; and, further, each rubber surface will possess this function, individually, whether the casing is reversed or not. Fig. 20 shows a transverse section of the detachable tread-band in place in the recurved recess, and the adaptability of the recurved recess to be attached to an open or a close tire of any of the prevailing forms in use. Fig. 21 shows a transverse section of a modified form of tread-band wherein spurs or calks attached to transverse lining springs project through the outer tread surface of tread-band. Fig. 22 shows a lateral view of adjacent lining springs provided with spurs or calks. Fig. 23 shows a downward view of tire provided with recurved recess, detachable tread-band and lining springs provided with spurs or calks. Fig. 24 shows a type of method of abutting ends of layers, bands, tubes or complete tire casing to secure a reversible band, tube or tire casing, and one which will not show inequalities of transverse outline due to unequal constriction of material at or near ends. Figs. 25 to 30, inclusive, show longitudinal tread section views of counterpart terminal closures of inflatable inner tube illustrating their action. Fig. 25 shows their position within abutting ends of tube. Figs. 26 and 27 show a cylindrical extension of counterpart ends of closures with ends of tube closed, and separated, respectively. Fig. 28 shows the concave closure forced forward by slight pressure to contact with convex closure while ends of tube remain separated. Fig. 29 illustrates the elongating feature of concave closure and relative positions of closures to separated ends of inner tube and to outer cover of tire when inner tube is fully inflated. Fig. 30 shows both tube and closures to be compacted, and a modification whereby the convex closure, also, is made extensible by folding its open end backward over itself, and confining the integral union of closure to end of tube to only a portion, and that the extreme portion of the turned inner surface. Fig. 31 is a transverse section of preferred form of an open tire casing, wherein the outer layer $b'$ may be replaced by $B^2$, showing arrangement of layers of fabric and rubber, together with non-stretching rim-bands of textile material also acting as flaps lapping inclosed inner tube. Fig. 32 shows a longitudinal tread section view of same showing relative position of closures to ends of inner tube and ends of inner tube to ends of tire casing. Fig. 33 shows a transverse sectional outline of an open tire, consisting of tire casing provided with recurved recess and detachable tread-band together with inflatable inner tube. Fig. 34 shows a non-stretching band of textile fabric, provided with a sheath, adapted to integrally unite edges of open casing to form a close tire, and, also, to provide for the use of a central adjusting rim band, if desired. Fig. 35 illustrates a type of the loop form of construction of tire in its normal loop form. Fig. 36 shows same with ends united as used on wheel rim. Fig. 37 shows methods of forming non-frayable ends to layers of material forming a band or tube to prevent a bulging or an undue constriction of free ends of tire under strain of inflation. Fig. 38 shows methods of forming ends, or edges, of repair sections; and, also, the adaptation of each form, as an individual section, to be reversed and to possess when covered with rubber, as previously shown, the puncture-closing function; it also shows how alternate similar and adjacent reversed sections may make up a sectional tire or tire casing which, as a whole, is reversible—the resulting evenness in thickness of tire, or casing, being free from any tendency to bulge at abutting ends of sections. Fig. 39 shows a repair section of tread recess provided with longitudinally projecting flaps; and, also, the adaptation of alternate sections, so provided, to lap intermediate ones, without them, in a recurved recess made up in sections. Fig. 40 shows an end view of a repair section of detachable tread-band with longitudinally projecting flaps and band sheath. Fig. 41 shows an upper view of same, showing that alternate sections provided with flaps enable adjacent sections to abut together at recurved tongue of tread-band. Fig. 42 shows end plate, provided with adjusting screw, bearing on end of tread-band. Fig. 43 shows sectional side view of end-plates of detachable tread-band united together; also, with adjusting and attaching devices. Fig. 44 shows the approximate shape in transverse section which a tube of open circular section will have a tendency to assume when the positions of inner and outer surfaces are reversed by turning. Fig. 45 shows a means for securing a compacted tread portion, equal in lateral extent to an approximate half of transverse section, by integrally uniting a layer of fabric to inner surface of rubber layer molded in form shown. Fig. 46 shows the approximate shape in transverse outline of Fig. 45 when the surfaces are reversed by turning. Fig. 47 shows in transverse outline the shape of mold or former used to accomplish this result.

In the drawings, A represents the tire or tire casing.

B is the inflatable inner tube; B' the closures adapted to close the ends of inner tube or of a tire; $B^2$ the band or tube provided with the recurved recess along tread circumference and is adapted to be applied to any of the ordinary forms of tire, and $B^3$ is the detachable tread-band adapted to be used on any tire provided with the recurved recess shown in $B^2$.

C is a rim band, preferably of metal, inclosed by the sheath C' of casing and provided with screw threaded ends which engage counterpart threaded screws or nipples $c$ which are provided with a head having a counter sunk bearing $c^3$ on the end-plate G, in the orifice $c'$ of which the shaft of nipple $c$ turns freely while engaging threaded end of rim band C, allowing the nipple to be tightened or slackened by means of a slotted head, or its equivalent, while its head retains its counter sunk bearing at $C^3$, and thereby regulates the length of tire or casing which is preferably attached to end-plate G by means of a headless pin or stud $g'$ and eyelet $g^2$.

To allow of the end-plates being removed from the nipples, while engaged with ends of rim bands, without disturbing the desired adjustment of length of tire, or tire bands, the end-plates G may be slotted as shown at $c^2$ to allow the shaft of nipple $c$ to pass through when the end-plate is pressed backward away from the countersunk engagement of the head of the nipple at $c^3$. This detachable feature of the end-plates enables an inner tube of annular form being wholly removed, and repairs to tube or tire made, and then replaced without disturbing adjustment of bands to tire casing.

D is the rim of wheel, which is preferably provided with two parallel grooves $C^2$ in its bed, or, their equivalent may be formed in the ordinary concave rim. by means of a rounded strip of suitable material made integral with rim along its central bed portion.

$d$ is an opening through rim of wheel to admit the passage of securing bolt $d^2$ of lever device, or a valve stem which may be used as such, to secure end-plates firmly to bed of wheel rim.

E is the bed-plate of the lever device which is preferably sunk slightly in the wheel rim and may be provided with a projecting tube E' passing through wheel rim at $d$, and secured by nut $d'$, and inclosing the bolt $d^2$ (or valve stem) which is secured by nut $d^3$.

Although the bearings of lever ends on wheel rim may be secured in any suitable manner and each bearing be an integral part of wheel rim, or an independent and regulatable attachment thereto, I prefer to take the strain of adjustment of tire to rim, and the strain of inflation, from the rim by the use of a bed-plate each approximate end of which is provided with means for securing a rocking bearing for an end of lever F at $e$ Figs. 1, 5 and 7. This rocking bearing may consist of a pivoted hinge, roller, knuckle or other joint. The opposite end of lever F is provided with a similar bearing on the end-plate G at $e$ Fig. 6. Although the levers, when kept taut in their bearings, will perform their functions without being secured to either bed-plate or end-plate, for convenience in operating them, it is desirable that at least one end of the lever be secured to its respective plate. I prefer that the end of lever bearing on end-plate of band be secured thereto by a pin $e'$ Figs. 6, 9, which is preferably made easily detachable by means of screw threaded and screw headed portions instead of being permanently riveted. As an immense strain can be brought to bear on the lever device by a direct downward pressure on the end-plate of band or indirectly on them by pressing downward the ends of tire or tire casing, I prefer not to trust to a pivot bearing, or hinge joint, to bear the strain exclusively, but to a simple rocking bearing of the extreme ends of lever—the use of the pivoted hinge joint being preferably confined to securing end of lever to end of tire. The operation of lever device, thus connected with the ends of a tire, to adjust tire to wheel rim consists in hooking the pendent end of a lever into its bearing on bed-plate of rim at $e$; pressing end of tire to its place on rim (passing it through fork if a bicycle wheel); revolving wheel with tire running through hand, to guide and adjust rim bands in rim grooves, until opposite end is over its seat; dropping pendent end of other lever in its seat; raising first end of tire slightly up from its seat until equi-distant with other end from rim; then pressing both ends, which are mutually accommodating, to their respective seats on rim, when, owing to the relative positions of bearings of lever ends as compared to each other and to points of attachment of bands to end-plates while end-plates occupy their seats on rim of wheel, the lever device locks itself.

To prevent lateral movement of lever end in its bearing at $e$ on bed-plate, I prefer to provide a slot $f^2$ Figs. 3, 4, 5, which engages a counterpart tongue $f^3$, Fig. 1, on bed-plate, or an interchange of same as to position, to approximate a knuckle joint. If desired to secure this end of lever, also, to bed-plate, another pin as at $ff'$ Fig. 6, or similar means, may be used.

H, Figs. 21, 40, 42, 43, is a band, preferably of metal, moving freely in its sheath H' to compress the material of detachable treadband, regulate its length, and allow of treadband being made up of sections. H, like rim band C, is provided with threaded ends which engage a screw or nipple $h$ with a head bearing on an end-plate K having orifice $h'$ in which shaft of nipple $h$ turns and performs the same functions for the detachable treadband that nipple C does for the tire. $k$ and $k'$ represent counterpart locking devices for securing end-plates of tread-band together and, preferably, consist of a headless pin-and-hole union.

I,-Figs. 21, 22, 23, is a puncture-proof lining spring provided with spurs or calks $i, i, i$, which form the means for preventing the slipping of tire on icy ground. The spurs or calks may be made integral with lining springs in any suitable manner, and placed otherwise than in the preferred manner shown. As shown, the terminal calks form a means for an abutting contact of the edges of tread-band with the lining springs without piercing the material of band; while others, placed nearer center of tread, occupy openings in tread-band adapted to receive them and through which they protrude, or they may normally, be flush with curves of treadband.

A Figs. 10 to 20 is a band or tube, preferably impregnated with rubber solution and vulcanized, of one or more layers of textile fabric of material cut parallel to a series of threads, cut bias, or, a band made up of layers cut both ways.

$a'$ indicates a lining layer of textile fabric, which may have compacted rubber surfaces, and is preferably cut bias, and which is made integral while stretched to an already compacted layer or tube of rubber and, as vulcanizing would destroy the compacted condition of the rubber, indicates that cement is preferably used.

$a^2$ indicates that the layer of textile fabric is used as a lining for an outer coating of rubber and is preferably vulcanized while stretched to a molded layer of rubber, both preferably of less circumferential curve than that which they are to be made to assume as an outer tire coating, but which may be used with curves reversed, by turning to form a still more compacted rubber lining, as indicated in Fig. 19 which shows two such layers integrally united by cement to form an open reversible tire which is equally compacted within, whichever way it is turned and used, and also which is equally compacted without, whichever way it is turned and used,—although the compaction of outer rubber surface necessarily is not so great as that of inner surface. Such a construction of tire enables it to be reversed when outer surface is worn at tread.

$b$ is a band or tube of rubber which, when made compacted, is preferably first turned inside out and the stretched textile fabric, preferably cut bias, made integral by cement and vulcanizing the rubber only so far, approximately, as textile layer extends within, and then reversing the curves by turning, and, if a close tube, by turning the outer rubber surface within and drawing it through the tube as it is impracticable, if not impossible, to turn it inside out and over itself if the thickness of rubber be considerable. The reason for first turning the rubber tube inside out, aside from the very desirable gain in the amount of compaction secured, is, that, if made integral in its normal condition and form, after turning the tube the portion not covered by textile fabric would be abnormally stretched on its outer surface and abnormally compressed or compacted on its inner surface; the amount of abnormal stretching of the rubber lessening from outer surface towards a medial curve, approximating in distance half the thickness of rubber layer, when it ceases and an abnormal compaction begins, increasing in relative ratio until its fullest extent is reached at the inner surface. This condition would be objectionable, as the strain on the slightest nick or abrasion on outer stretched surface would be intensified by the attendant compacted strain of material at inner surface tending to open the nick and deepening it—even if the rubber were not subjected to the pressure of inflation.

$b'$ is an auxiliary integral strip of rubber increasing the thickness of a rubber tube and covering abutting edges of same either within or without.

$b^2$ is a band or tube of rubber indicating a compaction of its material when used as an outer covering and an increased compaction as an inner lining, and is formed and used as stated in description of $a^2$.

$a^3$ Fig. 31 indicates a non-stretching band of textile material used to maintain the integrity of the loop form of construction of an open textile layer by preventing the edges of material to which it is made integral, by stitching, cementing or otherwise, from stretching and is shown in Fig. 31 as also forming the flaps $a^4$ which in the use of the construction as an open tire lap the inner tube and form means for its ready conversion to a close tire by use of cement.

$a^5$ shown in Fig. 31 as a space is designed to be occupied by the non-stretching band of fabric, $a^6$, Fig. 34, provided with a sheath for adjusting rim band, if desired.

There being no longitudinal strain (due to inflation) along the tread fibers of the material in the loop form of construction, when inflated on the wheel rim, the head surface is more sensitive and yielding to external pressure than the ordinary annular form of tire, so that less vibratory oscillations occur when the tread surface passes over slight inequalities or obstructions in the road. Where a firmer and less sensitive tread surface is desired, by use of the wire and tightening device in the detachable tread-band, any suitable tension may be obtained either as a feature of the tread-band wire, of the material of the tread-band, of both together, or, of the tire as a whole. It is pointed out in this connection that by cementing a strip of a non-stretching material along the tread while the loop is held in a circular form with ends abutting, or by cementing the detachable tread-band (having its material normally in the form of a loop, and so secured by a non-stretching band at tongue) in its seat in the recess of the tire, with tightening wires withdrawn, the functions possessed by the compacted material of tire at tread, due to the loop form, are retained while the tread of the tire is made to sustain its proportionate part of the strain of inflation and present thereby an increased resiliency of tread surface, over the ordinary tires, due to the compacted material. It is further pointed out that the body of the tire, the tread recess and detachable tread-band, each severally, and as well in combination, may have their loop ends united by cement, or otherwise, at discretion to form a continuous tire, tread recess or tread-band possessing the functions of the loop construction. As vulcanizing, while the tire is in a circular form, would destroy the compacted feature, care must be taken to confine such vulcanizing as is desired to the immediate part sought to be vulcanized and, preferably, while that portion of the band or tire is held on a curve corresponding to the original curve of the loop.

Having shown the various ways of producing a compacted layer of rubber in a tire and shown all of them acting in harmony together, in a loop form of tire, the fact must not be lost sight of, that the loop form of tire, alone, enables a tire, as a whole, to possess the compacted feature at the most desired portion—the tread, and, to a greater degree there than elsewhere, without the aid of any individual permanently compacted layer; and, in connection with transverse threads or fibers in a layer of its material, adds the puncture closing function to a transverse cut. But, although an open tire casing of loop form would be puncture-closing, the ordinary inner tube, if used in connection with it, when punctured, would cause the tire to become deflated, owing to escape of air from between inner tube and inner lining of casing. By cementing inner tube to casing along its upper portion, the escape of air through a puncture in the inner tube within said cemented portion would be prevented.

Notwithstanding that the loop form of construction of casing and compacted inner tube, secures each separately from loss of air through transverse cuts when used together, I prefer to cement the upper portion of inner tube to inner surface of casing; and, as the use of a solvent of cement to loosen it therefrom to make repairs, would also loosen an outer layer of fabric, were it used to retain the compaction of rubber inner tube (see Figs. 11 & 30), as well as a textile fabric lining to casing from adjacent rubber layer of casing, I prefer the retaining fabric of compacted inner tube to be within the inner tube, and the inner surface of casing to be of rubber, that, the two surfaces being of rubber, the cement may be carefully moistened with a solvent, if desired, without danger of disturbing the adjustment of layers in either casing or inner tube. The inner tube may in fact be cemented in its entirety within the casing to form a close tire, if desired, yet still be susceptible of ready removal without disturbing the integrity of the casing; or, it may constitute a permanent integral part of a close tire by covering it with its outer integral textile layer intact, as shown in Figs. 11 & 30, by use of cement, in any of the numerous ways employed in the various tires in use. When desired as a compacted lining for rubber tubing, hose piping, &c., the molding of the tube in the loop form is omitted and the compacted rubber tube in its cylindrical form is covered by the use of cement, or other means, in any desired manner and with any desired material.

It is desirable that the retaining fabric of the compacted rubber tube, whether in connection with its inner or outer surface, be of material cut bias to allow its stretching either longitudinally or transversely, as stretching in either direction in no way interferes with the compacted feature in performing its function; and, further, a thin coating of rubber on one or both surfaces of retaining fabric, where used on outer surface of an inner pneumatic tube, will lessen the friction consequent on drawing it through a close tire of any of the prevailing kinds.

As a distinction is made in the claims between reversing the positions of inner and outer surfaces and reversing the curve of a surface, a careful consideration of Fig. 45 and a comparison with Fig. 46 will show that the phrases are not synonymous. For Fig. 45 clearly shows that one half of the transverse curve of a circular or loop form of tire may be reversed at open portion $x\,x'$ without reversing the longitudinal curve or reversing the positions of outer and inner surfaces of the opposite closed portion $x'\,x'$ of tube; and, conversely, that the positions of outer and inner surfaces of closed portion $x'\,x'$ may be reversed by turning (when the longitudinal curve also will be reversed) without changing the transverse curves $x\,x'$ of open portion, the edges of which will tend to unite at $x—x$ and make the transverse curve of the tube circular.

I make use of the transverse ⋂ form in stretching, molding and vulcanizing a layer of rubber singly or in combination with a layer of textile material, as well as using it as a means for stretching and forming one or more layers of textile material cut bias and also a layer cut parallel with longitudinal threads. The outward sweep of the edges of the material held or molded in this form facilitates the union by stretching, cement or other means of a non-stretching textile band, or, a projecting flap to said edges, and of edges of different layers.

Having thus described my invention, what I claim as new and desire to secure by Letters Patent is—

1. In combination with a wheel rim and a tire having free ends, a lever with one end bearing on an approximate end of the tire and the other end bearing on the wheel rim at a point anterior to that occupied by the other end of lever when ends of tire are united or contact together in their allotted position on wheel rim, substantially as shown and described.

2. In combination with a wheel rim and a tire having free ends, two levers, each with one end bearing on an approximate end of the tire and the other end bearing on the wheel rim; the points of bearing on the wheel rim of the lever ends being so placed relative to each other and to the opposite ends of levers and ends of tire as to secure the desired union of ends of said tire at a point preferably intermediate and equi-distant from them, substantially as shown and described.

3. As a means for tightening a free ended tire to a wheel rim, a lever with one end adapted to bear on the wheel rim and the other end on an approximate end of the tire, substantially as shown.

4. As a means for tightening a free ended tire to a wheel rim, a lever device consisting of a lever with an end attached to an end of a tire by means of counterpart rocking bearings with its opposite end adapted to bear on the rim of a wheel, substantially as described.

5. As a means for tightening a free ended tire to a wheel rim, a lever device consisting of a lever with an end attached to and engaging a wheel rim by means of counterpart rocking bearings and its opposite end adapted to bear on the end of a tire, substantially as described.

6. As an article of manufacture, a lever device for tightening a tire to a wheel rim, consisting of a lever with each end attached to a separate block or plate by means of counterpart bearings and said plates adapted to be secured to a wheel rim and a tire, or tire band, respectively, substantially as described.

7. As an article of manufacture, a lever device for tightening a tire to a wheel rim, consisting of a plate to each approximate end of which is attached or engaged an end of an independently acting lever by means of counterpart rocking bearings; the opposite ends of said levers adapted to engage by means of similar bearings the ends of a tire or other band, substantially as shown and described.

8. A lever tightening device for tightening a tire to a wheel rim, consisting of a plate to each approximate end of which is attached or engaged an end of an independently acting lever by means of counterpart bearings; the opposite ends of said lever engaging by similar bearings the ends of a band, or bands, in such manner that a downward movement of the ends of band will cause them to approach each other as they approach the central portion of plate, substantially as shown and described.

9. A lever tightening device for tightening a tire to a wheel rim, or other purpose, consisting of a plate to each approximate end of which is attached or engaged an end of an independently acting lever by means of counterpart bearings; the opposite ends of said lever engaging by similar bearings the ends of a band, or bands, that a downward movement of the ends of band will cause them to approach each other as they approach the central portion of plate until, owing to the relative positions of bearings at plate being above the alinement of the bearings on ends of band with reference to the curve of band and point of contact of ends of band with plate, the ends of band diverge and lock themselves, substantially as shown and described.

10. In combination with a wheel rim, a tire or tire band with free ends, one end adapted to be secured to said rim, the other provided with a lever, an end of which engages it with a counterpart bearing, the other end of lever similarly engages the wheel rim at a point anterior to place of contact with rim of other end of lever when tire is in position on wheel rim, but sufficiently above the rim bed to cause the lever end of tire to lock itself on being forced to its seat on rim of wheel, substantially as shown and described.

11. A lever tightening device consisting of a band provided with screw threaded ends, a counterpart screw or nipple with a head provided with means for turning the same engaged on each end, an end-plate provided with an orifice through which said nipple engages the threaded end of said band, the head of said screw or nipple engaging said end-plate, which is preferably slotted to said orifice to admit shaft of nipple, and two levers with an end of each engaging each end plate respectively and the other end of lever adapted to engage a wheel rim or rim plate, substantially as shown and described.

12. In a tire, the combination of a tightening band, at rim or tread circumference, provided with screw threaded ends, a counterpart screw or nipple with a head provided with means for turning the same engaged on each end and an end-plate, attached to or bearing on each end of said tire, provided with an orifice through which said screw or nipple engages the threaded end of said band, substantially as described.

13. In a tire, the combination of a pair of tightening rim bands. with screw threaded ends, a counterpart screw or nipple with a head provided with means for turning the same engaged on each end, two end-plates, each provided with a pair of orifices through which the screws or nipples engage adjacent threaded ends of bands respectively, the head of screw or nipple bearing on said end-plate which is preferably slotted to said orifice to admit shaft of screw or nipple, substantially as described.

14. A tire or tire casing consisting of a band or tube of layers of canvas or other suitable material, cement or rubber integrally uniting the layers, and non-frayable ends formed by folding back a layer of its material at each end, substantially as shown and described.

15. A tire or tire casing consisting of a band or tube of layers of canvas or other suitable material; one layer approximately non-stretchable laterally, other layers preferably of material cut bias; cement or rubber integrally uniting the layers, and non-frayable ends formed by folding back a layer of its material at each end, substantially as shown and described.

16. A tire or tire casing consisting of a band or tube of canvas or other suitable material provided with non-frayable ends formed by a folding back of its material at each end and with a projecting flap at one end adapted to inwardly lap the opposite end, substantially as described.

17. A tire or tire casing consisting of a band or tube of canvas or other suitable material provided with non-frayable ends formed by a folding back of its material at each end, and with an integral projecting flap at one end adapted to inwardly lap the opposite end, together with one or more integral inclosed portions at rim circumference forming a sheath for the insertion of a wire or other band, substantially as described.

18. A free-ended pneumatic tire or tire casing of canvas or other suitable material wherein threads or fibers are woven, wound or otherwise placed transversely and at right angles with reference to the tread of the tire, and a non-stretching longitudinal band or bands cemented or otherwise integrally secured to said threads or fibers at rim circumference of tire while the material of tire is circumferentially stretched laterally and longitudinally at tread to the extent that its ends concentrically or spirally lap: said rim band or bands by securing the gathered material at rim causing the tire to normally assume the form of a loop of a coil, substantially as described.

19. A free-ended pneumatic tire or tire casing of canvas or other suitable material and a non-stretching longitudinal band or bands cemented or otherwise integrally secured to said canvas at rim circumference of tire while said material is circumferentially stretched laterally and longitudinally at tread to the extent that its ends concentrically or spirally lap: said band or bands by securing the gathered material at rim causing the tire or casing to assume the form of a loop of a coil, substantially as described.

20. A free-ended pneumatic tire or tire casing of canvas or other suitable material having a layer of rubber cemented or vulcanized on its outer surface while the canvas is circumferentially stretched laterally and longitudinally at tread to the extent that its ends concentrically or spirally lap, causing said tire or casing to normally assume the form of a loop of a coil, substantially as shown and described.

21. A free-ended tire or tire casing, of canvas or other suitable material, having a lining of rubber cemented or vulcanized onto its inner surface while the canvas is circumferentially stretched laterally and longitudinally at tread to the extent that its ends concentrically or spirally lap causing said tire or casing to normally assume the form of a loop of a coil, substantially as shown and described.

22. A tubular tire or tire cover, wherein rubber forms a constituent or integral part, provided with free ends which normally tend to lap; the rubber having been fused or vulcanized and allowed to set while said tire or cover was stretched at tread and molded, or otherwise held, with ends lapping spirally or concentrically, substantially as shown and described.

23. A free-ended pneumatic tire consisting of an outer casing, of canvas or other suitable material, open along rim circumference and an inner inflatable tube, sealed at both ends, cemented or vulcanized along its tread portion to said casing without stretching it while said casing is circumferentially stretched laterally and longitudinally at tread to the extent that its ends lap either spirally or concentrically, substantially as shown and described.

24. In combination with an annular or free-ended tire or tire casing, of canvas or other suitable material, open at rim, an inner inflatable tube or lining with free ends which normally tend to lap owing to its having been molded or otherwise formed in the shape of a loop of a coil; said tube being cemented or otherwise made integral with said tire or casing along its tread circumference while said tire or casing is circumferentially stretched transversely and longitudinally at tread, substantially as described.

25. In combination, a pneumatic tire casing of canvas, or other suitable material, open or closed at rim but having free ends, and an inflatable inner tube sealed at both ends and cemented or vulcanized along its entire tread portion to said free-ended casing, substantially as described.

26. An inflatable inner tube for a pneumatic tire consisting of an open-ended tube each end of which is sealed by the insertion of the open end of a closure, consisting of a flexible tube closed at one end, the outer surface of cylindrical portion of each closure made integral with inner surface of said tire tube, preferably, by the use of cement or other detachable means.

27. An inflatable inner tube for a pneumatic tire consisting of an open-ended tube with edges of its free ends adapted to abut together over a projecting sealed portion of one end of tube, which portion is formed by the insertion of a flexible tube, closed at one end, the outer surface of cylindrical portion made integral with inner surface of tire tube, preferably by the use of cement or other detachable means, while its projecting closed portion in telescoping contacts with a relatively placed interior membrane sealing opposite end of tire tube.

28. In combination with a pneumatic tire or tire tube, a pair of terminal closures consisting each of a flexible tube closed at one end by a concavo-convex portion and each closure inserted with its open end within said tire tube and the outer surface of cylindrical portion of each closure, as inserted, made integral, wholly or in part, with the inner surface of said tire or tube by any suitable desired means; the convexity of one closure being reverse in use to a concave form, or, it may, if desired, be molded in that form.

29. In combination with a pneumatic tire or tire tube, a terminal closure consisting of a flexible tube, closed at one end, conforming cylindrically to inner surface of said tire tube, inserted with its open end within that of said tire tube and its cylindrical surface, or a portion thereof, made integral with tire tube's inner surface—which union may be effected by cement or other detachable means, if desired.

30. In combination with a pneumatic tire or tire tube, a terminal closure consisting of a flexible tube, closed at one end, conforming cylindrically to inner surface of said tire tube, inserted with its open end within that of said tire tube and its cylindrical portion made integral with tire tube's inner surface— which union may be effected by the use of cement or other detachable means.

31. As a means for sealing the end of a pneumatic tire or tire tube, a terminal closure consisting of a tube of rubber closed at one end, approximately conforming cylindrically to inner surface of tube to allow of a sliding of tube and telescoping of its convex end within itself.

32. In combination with a pneumatic tire casing with ends adapted to abut together over an inner projecting flap, an inner inflatable tube or lining provided with a pair of terminal closures sealing its ends.

33. As a means for sealing an end of a pneumatic tire or tire tube, a terminal closure consisting of a flexible tube closed at one end and approximately conforming cylindrically to inner surface of tube to allow of a sliding of tube and telescoping of end within itself.

34. A terminal closure consisting of a cylindrical tube of rubber provided with a concavo-convex portion closing one end and a layer or longitudinal strip of textile fabric made integral, preferably by vulcanizing, to its inner surface.

35. As a means for sealing an end of a pneumatic inner tube to secure an extensible end, a terminal closure consisting of a flexible tube, closed at one end, whose open end is turned back over itself to any desired extent and the extreme portion of its turned inner surface made integral, preferably by cement and vulcanizing, with, approximately, the extreme portion of inner surface of pneumatic tube, substantially as shown and described.

36. As a means for sealing an end of a pneumatic inner tube to secure an extensible end, a terminal closure consisting of a flexible tube, closed at one end, whose open end is inserted within an end of said pneumatic tube and made integral therewith, preferably by cement and vulcanizing, with the closed end of closure projecting out from end of pneumatic tube the desired distance, when the curve of surfaces of projecting closed portion is preferably reversed by forcing the projecting end within the tube, substantially as shown and described.

37. A puncture-closing terminal closure consisting of a tube of rubber, possessing preferably a molded concavo-convex end and an open end, and a layer of textile fabric (which may be knitted) molded, cemented and, preferably, vulcanized to its normal inner surface; thus adapting it, when turned, to form a convex closure, which may be extensible, and which will be compacted and puncture-closing to the extent turned, and when its convex outer surface is reversed to a concave surface, to form a concave closure, it will be puncture-closing to the extent of said surface reversal.

38. In combination, a pneumatic tire, tire casing or tube, of canvas or other suitable material, having free ends adapted to abut together over a projecting flap inwardly secured to one end and a tubular air tight lining having a projecting sealed end and a counterpart recessed sealed end correlatively placed in relation to the ends of said tire, casing or tube to secure their contact on abuttal of ends of tire, substantially as described.

39. A pneumatic tire consisting of a casing, of canvas or other suitable material, open at rim circumference with ends adapted to abut together over a projecting flap secured to one end of casing, an inflatable tube with its upper portion cemented or vulcanized along the inner tread circumference of casing; said tube having its ends sealed by inwardly placed counterpart terminal closures in such manner that the correlative position of counterpart closures, with reference to the ends of tube and the ends of tube with reference to ends of casing and flap, shall secure contact of said counterpart closures on the abuttal of ends of casing and the inflation of tire thus formed, substantially as described.

40. In a tire or tire casing, two bands or tubes, of canvas or other suitable material, one preferably non-stretchable laterally, the other preferably of material cut bias, a layer of rubber or cement between integrally uniting them, one band or tube having its material at each end folded backward on itself and cemented or otherwise integrally secured thereto with an end abutting an end of the other band or tube, substantially as shown.

41. In a tire or tire casing, two bands or tubes, of canvas or other suitable material, one preferably non-stretchable laterally, the other preferably of material cut bias, a layer of rubber or cement between integrally uniting them, the outer band or tube having its material at each end folded backward on itself and cemented or otherwise integrally secured thereto with an end abutting an end of the inner band or tube and the opposite end of said outer band or tube lapped by the projecting end of said inner band or tube and cemented or made integral therewith, said projecting end of inner band or tube forming a flap adapted to inwardly lap the opposite end of casing thus formed, substantially as shown and described.

42. In a tire or tire casing, or section thereof, two longitudinally extending bands or tubes of canvas or other suitable material, one preferably approximately non-stretchable laterally, the other preferably of material cut bias, a layer of rubber or cement between integrally uniting them, the outer band or tube having its material folded backward on itself at each end and cemented or otherwise integrally secured thereto; the inner band or tube having an end projecting beyond that of the outer band or tube forming a flap adapted to inwardly lap the outer band of opposite end of tire or casing, or adjacent section thereof, substantially as shown and described.

43. A free-ended tire or tire casing, or section thereof, consisting of two longitudinally extending bands or tubes, of canvas or other suitable material, one preferably non-stretchable laterally, the other of material cut bias; a layer of rubber or cement between integrally uniting them; the inner band or tube having an end projecting beyond that of the outer band or tube forming a flap adapted to inwardly lap the opposite end of tire or adjacent section thereof, substantially as shown and described.

44. In a tire or tire casing, or section thereof, a longitudinally extending band or tube consisting of two layers or thicknesses of canvas or other suitable material, a layer of cement or rubber integrally uniting the two layers, placed with approximately abutting ends, a folding back of the material of a layer on itself and integrally united thereto forming the non-frayable ends of the band or tube, substantially as shown and described.

45. In a tire or tire casing, or section thereof, a longitudinally extending band or tube consisting of two layers or thicknesses, of canvas or other suitable material, a layer of cement or rubber integrally uniting the two layers, a fold of the material backward on itself forming each non-frayable end of the band or tube, substantially as shown and described.

46. In a tire or tire casing, or section thereof, a longitudinally extending band or tube consisting of two or more layers or thicknesses of canvas or other suitable material cemented or otherwise integrally united; the non-frayable ends of said band or tube made by a folding back of an outer layer of its material, substantially as shown and described.

47. In a tire or tire casing, or section thereof, with ends adapted to abut together, a band or tube of one or more layers of canvas or other suitable material (textile) having a layer of its material at each end folded backward on itself and integrally secured thereto forming non-frayable ends, substantially as shown and described.

48. In a reversible tire casing open at rim, two bands of canvas or other suitable material, one preferably of material cut bias the other preferably non-stretchable laterally; the non-frayable ends of each band adapted to abut together but an end of inner and an end of outer band adapted to lap forming the non-frayable ends of the reversible casing, substantially as shown and described.

49. A section of a tire or tire casing consisting of two bands or tubes longitudinally extending with reference to the tire, of canvas or other suitable material, one approximately non-stretchable laterally with reference to the tire, the other of material preferably cut bias, a layer of rubber or cement between integrally uniting them, a band or tube forming a flap adapted to lap the end of an adjacent section, substantially as shown and described.

50. A section of a tire or tire casing of two or more layers of canvas or other suitable material integrally united by cement or other means, approximately non-stretchable laterally with reference to the tire, provided with a projecting layer forming a flap adapted to lap the end of an adjacent section, substantially as shown and described.

51. A section of a tire or tire casing consisting of layers of canvas or other suitable material cemented or otherwise integrally united, the abutting ends formed by a folding back of a layer of its material, and a projecting layer forming a flap adapted to lap the end of an adjacent section, substantially as shown and described.

52. A repair section, adapted to be inserted with outer surface of ends flush with that of the tire, consisting of a band or tube, of one or more layers of canvas or other suitable material, provided with an inner layer of material projecting from each end of section forming flaps adapted to lap inwardly the ends of adjacent portions of tire, substantially as described.

53. A repair section, adapted to be inserted with outer surface of ends flush with that of the tire, consisting of a band or tube, of one or more layers of canvas or other suitable material, provided with an inner layer of material projecting from each end of section forming flaps adapted to inwardly lap the ends of adjacent portions of tire adapted to receive said section, and provided with one or more integrally inclosed portions at rim forming sheaths for the insertion of a rim band, substantially as shown and described.

54. A pneumatic tire or tire casing, of canvas or other suitable material, of free ended loop form and open along rim circumference, its approximate edges provided with an integral inclosed portion forming a sheath for the insertion of a wire or band; and a band of textile material made integral with each rim edge forming an inwardly projecting flap: said flaps being adapted to lap under an inflatable inner tube, substantially as shown and described.

55. A pneumatic tire casing, of canvas or other suitable material, having a rubber lining and provided with free ends and open along rim circumference, having each approximate rim edge provided with an integral inclosed portion, forming a sheath for the insertion of a wire or other band, and an inwardly projecting longitudinal flap; said flaps being adapted to lap under an inflatable inner tube, substantially as described.

56. The combination of a free-ended tire casing, of canvas or other suitable material, open along rim circumference having each approximate rim edge provided with an integral inclosed portion forming a sheath for the insertion of a wire or other band, and an inwardly projecting longitudinal flap, with an inner inflatable tube, provided with sealed ends, cemented along its tread portion to the inner surface of said casing.

57. The combination of a free-ended tire casing, of canvas or other suitable material, open along rim circumference, a rim band of textile material provided with an integral inclosed portion forming a sheath, cemented or otherwise made integral with and uniting the rim edges of said casing, and an inner rubber tube made integral with the casing thus formed, by cement or vulcanizing, substantially as shown and described.

58. The combination of a free-ended tire casing, of canvas or other suitable material, open along rim circumference, a rim band of textile material provided with an integral inclosed portion forming a sheath, cemented or otherwise made integral with and uniting the rim edges of said casing, and an inner rubber tube, having sealed ends, made integral with the casing thus formed by cement or vulcanizing, substantially as shown and described.

59. The combination of a tire casing, provided with free ends adapted to abut together over an inner flap, open along rim circumference, a rim band of textile material provided with an integral inclosed portion forming a sheath, cemented or otherwise made integral with and uniting the rim edges of said casing, and an inner rubber tube made integral with the casing thus formed by cement or vulcanizing, substantially as shown and described.

60. The combination of a tire casing, provided with free ends adapted to abut together, open along rim circumference, a band of textile material provided with an integral inclosed portion forming a sheath cemented or otherwise made integral with and uniting, the rim edges of said casing, and an inner rubber tube, having sealed ends, made integral with the casing thus formed by cement or vulcanizing, substantially as shown and described.

61. The combination of a free-ended tire or tire casing with a rim band of textile material, provided with an integral inclosed portion forming a sheath, cemented or otherwise made integral with its rim circumference, substantially as described.

62. In a tread-band, of rubber or other suitable material, possessing an inwardly projecting longitudinal tongue and laterally extending flanking portions, an integral inclosed portion wholly within said tongue forming a sheath for the insertion of a wire or other band, substantially as shown and described.

63. In combination with a detachable tread-band, of rubber or other suitable material provided with an inwardly projecting tongue having an integral inclosed portion forming a sheath wholly within said tongue, a wire or band occupying said sheath provided with means for compressing or extending the material of said tread-band, substantially as shown.

64. In combination with a detachable tread-band, of rubber or other suitable material, provided with an inwardly projecting longitudinal tongue, a wire or band inclosed within said tongue provided with counterpart attaching end.portions, substantially as shown.

65. In combination with a detachable tread-band, of rubber or other suitable material, provided with an inwardly projecting tongue, a wire or other band inclosed within said tongue provided with screw-threaded end portions engaging counterpart threaded end-plates or nipples bearing on the material of said tread-band, substantially as shown.

66. In a detachable tread-band, a band of one or more layers of textile material wherein a fold of its material secured by stitching, cement or otherwise is made to form a sheath for the insertion of a wire or other band and constitute an inwardly projecting longitudinal tongue, substantially as shown.

67. In combination with a lining spring having a recurvature of its central portion approximating an outwardly opening longitudinal dovetailed recess, and a counterpart longitudinal tongue, spurs or calks made integral therewith and projecting from its outer surface, substantially as shown and described.

68. In combination with a detachable tread-band, of rubber or other suitable material, or a section or segment thereof, provided with an inwardly projecting longitudinal tongue of approximate dovetailed form, and lateral flanking portions, lining springs clasping said tongue provided with spurs or calks projecting from their surface through the outer surface of said tread-band, or section, substantially as shown and described.

69. In combination with a detachable tread-band, of rubber or other suitable material, or a section or segment thereof, provided with an inwardly projecting longitudinal tongue, lining springs clasping said tongue provided with spurs or calks projecting from approximate ends and against which edges of tread-band, or sections, abut, substantially as shown and described.

70. A reversible, puncture-closing pneumatic tire, tire casing, or segmental section thereof, consisting of two or more layers of canvas, or other suitable material, one of which is provided with a compacted layer of rubber, or other elastic substance or material, forming tire's inner surface, and another layer of canvas provided with an outer layer of rubber forming the outer surface of said tire, casing or section.

71. A reversible puncture-closing pneumatic tire, tire casing, or segmental section thereof, consisting of two bands or layers of canvas or other suitable material, of open loop or annular construction; both bands or layers provided normally with outer layers of rubber, or other elastic substance, made integral therewith, preferably by vulcanizing, but one of which is reversed to form a compacted inner lining of rubber, and both made integral to provide the puncture-closing feature on the reversal of tire or section.

72. As a means for securing a circular transverse contour to a tire or other tube, a layer or band of rubber, textile or other flexible material of annular or loop construction possessing a molded $\Omega$ shaped transverse section, substantially as described.

73. The combination of a layer or band of textile material, preferably impregnated with rubber, of annular or loop construction stretched, vulcanized, molded or otherwise formed in ∩ shaped transverse section with a non-stretching band of textile material stitched, cemented, vulcanized or otherwise made integral with each edge of said layer to secure the integrity of its annular or loop construction against longitudinal stretching, substantially as shown and described.

74. The combination of a layer or band of textile material, of annular or loop construction, stretched or otherwise formed in ∩ shaped transverse section with a band of material stitched or otherwise made integral with an edge of said layer to form an inwardly lapping flap on the reversal of curves of free edges of said layer, or, the reversal of surfaces of said layer or band, substantially as shown and described.

75. As a means for securing a compaction of but half of surface of a tire, or a layer of same, the combination of an inner band or layer of textile material with an outer band of rubber or other elastic material both layers or bands of ∩ shaped transverse section and of loop or annular construction integrally united by cement, vulcanizing or other means and the surfaces of resulting compound band reversed, substantially as described.

76. The integral union, preferably by cement, of a tubular loop of textile material with a layer of rubber on its outer surface while the material of said tubular loop is circumferentially stretched transversely and longitudinally at tread; said layer of rubber normally of open loop construction having transverse and longitudinal inner curves less than the outer corresponding curves of said tubular textile loop thus stretched to produce a compacted rubber surface at tread.

77. In combination with an annular or free-ended tire or tire cover, an outer covering of rubber or other elastic substance which normally is of open loop construction having a transverse inner curve less than the outer curve of said tire made integral with it while said tire is circumferentially stretched transversely and longitudinally at tread, substantially as described.

78. As a means for securing an outer compacted tread surface for a tire, a band consisting of an open tube of one or more layers of textile material integrally united with an outer layer of elastic material and molded in the form of a loop of a coil, substantially as described.

79. An outer cover, or a lining thereof, for a pneumatic tube consisting of a band or tube open at rim circumference, of canvas or other suitable material, of free-ended, loop or annular form having a layer of rubber forming its inner surface made integral with said band or tube when said band or tube was turned inside out and circumferentially stretched transversely and longitudinally at tread together with a non-stretching band of textile material made integral therewith at each rim edge, substantially as described.

80. A lining or inner tube for a pneumatic tire consisting of a band or tube of textile material in the form of a loop having a layer of rubber forming its inner surface made integral with said band or tube when the said band or tube was turned inside out and circumferentially stretched transversely and longitudinally at tread—the textile material retaining the compaction of the rubber thus obtained, substantially as described.

81. A lining or inner tube for a pneumatic tire consisting of a loop of rubber tubing having a strip of textile material on its upper outer, or tread, portion; said strip having been made inwardly integral with said tube but owing to the reversal of the inner and outer surfaces of said loop by turning, it constitutes means for retaining the compaction of the rubber at said tread portion of said loop, substantially as described.

82. A lining or inner tube for a pneumatic tire or tire casing consisting of a rubber tube, molded in the form of a loop, turned inside out, a strip of textile material cemented or integrally united to its inner upper portion, as turned, and the tubular loop returned to its original form—the strip of textile material retaining the transverse and longitudinal compaction of the rubber at said portion of the tubular loop, substantially as described.

83. In combination with a continuous or free-ended inflatable inner tube for a pneumatic tire, a longitudinal strip of textile fabric cemented or vulcanized along its tread portion while said tube, molded in the form of a loop, was turned inside out and the fabric circumferentially stretched within; the said fabric retaining the consequent transverse and longitudinal compaction of the rubber at said tread portion and preventing its expansion on returning the rubber to its normal form, substantially as described.

84. The combination of a molded loop of rubber tubing and a strip of textile material integrally united with its upper inner surface, substantially as and for the purpose set forth.

85. The combination of a molded loop of rubber tubing and a layer of textile material integrally united with its inner surface, substantially as shown.

86. The combination of a molded loop of rubber tubing and a layer of textile material integrally united with its outer surface, substantially as shown.

87. A lining or inner tube for a pneumatic tire consisting of a rubber tube, turned inside out, a strip of material cemented or integrally united to its inner upper portion, as turned, and the tubing returned to its original form—the strip of textile material retaining the consequent transverse compaction of the rubber at said portion of the tube, substantially as described.

88. In a tube of cylindrical, loop or annular construction, and non stretching material the combination of a tube of textile or other non-stretching material as an integral lining to such tube with a compacted inner tube of rubber, or other elastic substance, said rubber tube having been integrally united to said inner surface of textile lining tube as an outer covering when the surfaces of said textile lining tube were reversed, substantially as described.

89. The combination of an inner pneumatic tube, of loop or other construction, and a layer of non-stretching textile material, preferably cut bias, cemented or otherwise integrally united to the outer tread portion of said tire tube in such manner as to compact the elastic material of said tube at said tread portion and retain said compaction under the strain of inflation while the remaining or rim portion is allowed to expand.

90. The combination of a tire cover, tube or other vessel of non expansible material with a compacted puncture-closing lining, of textile or other non-expansible material, wherein rubber or other similar elastic substance forms a constituent or integral part; the compacted inner surface of said lining being produced by reversing the curves of the inner and outer surfaces of said lining when molded to the form of the inner surface of the tube or vessel to be lined by turning said lining inside out, substantially as described.

91. A tire or tire cover, wherein rubber forms a constituent or integral part, provided with free ends which normally tend to lap; the rubber having been vulcanized or fused and allowed to set while said tire or cover was stretched at tread and molded, or otherwise held, with ends lapping spirally or concentrically, and to which a non-stretching band of textile material is made integral at its rim circumference to prevent longitudinal stretching.

92. As a means for securing an outer compacted tread surface for a tire, a band or open tube of one or more layers of textile material integrally united with an outer layer of elastic material and molded in the form of a loop of a coil, together with an integral non-stretching band of textile material at each rim edge.

93. A strip, layer or sheet of material of normal flat surface, consisting of a layer of textile material to one side of which has been made integral by cement, vulcanizing, or other suitable means, a layer of rubber or other elastic substance while held in cylindrical form on its outer surface as curved, and to the other side of which textile material has also been made integral, by same or similar means, another layer of rubber or other elastic substance when the textile material was held in a reversed cylindrical curve.

94. A strip, layer or sheet of material, of normal flat surface, consisting of the integral combination of a layer of textile material of normal flat surface with a compacted layer of rubber, or other elastic substance, on each surface of said textile layer, substantially as described.

95. The integral combination of two layers of textile material with a compacted layer of rubber between; each surface of compacted rubber layer having been made integral with its adjacent textile layer and to its outer surface when said textile layer was held in a curved form.

96. A reversible puncture-closing pneumatic tire casing, or segmental section thereof, consisting of two bands or layers of textile material of open loop or annular construction; both bands provided normally with an outer layer of rubber made integral therewith, preferably by vulcanizing, but one of which bands is reversed to form a compacted inner lining of rubber; each made integral with other at rim edges by stitching, cement, vulcanizing or other means.

97. A reversible tire casing, open at rim, with each rim edge provided with a sheath for the insertion of rim wires, two rubber coated textile bands providing the outer and inner rubber surfaces of casing, the ends of each band adapted to abut together.

98. A reversible tire casing, open at rim, with each rim edge provided with a sheath for the insertion of a rim wire or other band, two rubber-coated textile bands providing the outer and inner surfaces of casing, the ends of each band adapted to abut together but an end of inner and an end of outer band adapted to lap.

99. A reversible puncture-closing tire casing, open at rim, with each rim edge provided with a sheath for the insertion of rim wires, two rubber-coated textile bands or layers providing the outer and inner rubber surfaces of casing, the rubber being made integral and preferably vulcanized to the outer surface of each textile band, while separate, while held or molded in a transverse curve,— one band being reversed to form a compacted lining.

100. A reversible puncture-closing tire casing, open at rim, of free-ended, loop or annular form, provided at each rim edge with a textile band carrying an inclosed sheath for a rim-wire and an inwardly projecting flap; together with an outer and an inner textile layer providing the reversibly compacted rubber surfaces of casing by each layer, while separate, being outwardly covered with a rubber coating while held, molded and vulcanized in a transverse curve and one layer reversed to form a compacted lining.

101. A reversible puncture-closing open tire casing with ends adapted to abut together and provided at rim edges with a sheath for a rim-wire, the outer and inner layers of textile fabric provided with a layer of rubber which was previously made integral therewith as an outer coating while each layer was, while separate, molded and preferably vulcanized in the same cylindrical, loop or annular curve but one of which textile layers is reversed to form a puncture-closing lining.

102. A reversible puncture-closing pneumatic tire casing of flat, open loop or other construction, consisting of two bands or layers of textile material of a length to more than equal that of the tread periphery of tire when in use; each band or layer provided with an outer covering of rubber molded in open transverse tubular form which may be confined to approximate tread portion, one of which layers is reversed to form a compaction of rubber and each made integral with other at rim edges by stitching, cement or other means, and the cover provided with means for securing the gathered material at each rim edge.

103. A reversible puncture-closing pneumatic tire casing, consisting of two integral bands or layers of textile material, in one of which threads traverse the tire at right angles, of a length to more than equal that of the tread periphery of the tire when in use, provided with means for securing the gathered material at each rim edge; each band or layer provided with an outer covering of rubber, which in its lateral extent may be confined to the approximate tread portion, molded on a transverse curve, one of which is reversed to form a compaction of the rubber which, owing to the transverse threads, will close a transverse cut.

104. A free-ended reversible puncture-closing pneumatic tire casing, open at rim, consisting of a band, or layers, of textile material, wherein threads traverse the tire at right angles, of a length to more than equal that of the tread periphery of the tire when in use; provided with a sheath at each rim edge for the insertion of a rim-wire; means for gathering the material at each rim edge to secure a loop form to the casing, and an outer and an inner coating of rubber.

105. In a pneumatic expansible tire tube, the integral combination of a strip of textile material, preferably cut bias, provided with a coating of rubber, with a surface of the approximate tread portion—the integral union extending laterally from edge to edge of said strip and preventing the expansion of the rubber at said tread portion while rim portion is left free to expand.

106. In a pneumatic expansible tire tube, the integral combination of a strip of textile material, preferably cut bias, with a surface of the approximate tread portion—the integral union extending laterally from edge to edge of said strip and preventing the expansion of the rubber at said tread portion while rim portion is left free to expand.

107. An expansible puncture-closing inner rubber tube of cylindrical, loop or other free-ended form having the compaction of the rubber of its tread portion retained under the strain of inflation by a layer of textile material made integral therewith while rim portion is allowed to expand and having each free end separately sealed or closed by any suitable means.

108. An expansible puncture-closing inner rubber tube, of cylindrical, loop or other form provided with a strip of textile material made integral throughout its lateral extent with either or both surfaces of the approximate tread portion of said tube and retaining a compaction of said tread portion of tube under the strain of inflation while the rim portion is allowed to expand.

109. A free-ended pneumatic tube consisting of a tube of rubber provided with a strip of textile material along its tread portion, on either or both surfaces, retaining a compaction of the rubber at said portion while rim portion is left free to expand, and with concavo-convex closures sealing its ends.

110. As a means for securing the compaction of an approximate half, or a portion, of a cylindrical, flattened, or other rubber tube with open or sealed ends, without reversing it by turning it inside out, a strip of textile material, preferably cut bias, cemented, vulcanized or otherwise made integral with the outer surface of said portion while said surface is held in a transverse concave curve.

111. A compacted puncture-closing inner tube for a pneumatic tire, consisting of the combination of a tube of rubber, of cylindrical, loop or other form, with an integral longitudinal outer layer or tube of textile material, preferably with threads running diagonally with tube, which may be limited to tread portion or extend laterally to any desired extent even to a lapping of edges, made integral to said rubber surface as an inner lining layer subsequent to a reversal of said rubber tube wherein a layer of fabric made integral with its inner surface had with said reversal compacted said rubber tube—which layer had been removed after the opening of tube by a longitudinal cut along tread to facilitate the said integral union of first mentioned layer and prior to the reunion of said tread edges by an integral strip of rubber (preferably vulcanized thereto) and prior to the final reversal of tube.

112. A compacted tube of cylindrical, loop or other form, consisting in combination of a tube of rubber and an integral longitudinal inner layer of textile fabric, extending laterally to any desired extent, made integral with said rubber surface subsequent to a reversal of said rubber tube wherein a layer of textile fabric made integral with its inner surface had with said reversal compacted said rubber tube and which, on the integral union of said first mentioned layer, had been removed.

113. A compacted tube of cylindrical, loop or other form, consisting in combination of a tube of rubber and an integral longitudinal outer layer or tube of textile fabric made integral to said rubber surface as an inner lining layer subsequent to a reversal of said rubber tube wherein a layer of fabric, made integral with its inner surface, had with said reversal compacted said rubber tube and which had been removed subsequent to the integral union of first mentioned layer and prior to the final reversal of tube.

114. A compacted tube of cylindrical, loop or other form, consisting in combination of a tube of rubber and an integral longitudinal outer layer of textile fabric made integral to said rubber surface as an inner lining layer subsequent to a reversal of said rubber tube (which at that time may have been a laterally curved strip or open tube)—wherein a layer of fabric made integral with its inner surface, had with said reversal compacted said rubber tube and which had been removed subsequent to the integral union of first mentioned layer and prior to a union of edges of open tube and the final reversal of tube.

115. In a free ended tire casing, a non-stretching strip of textile material, which in lateral extent may be confined to tread portion, in combination with a bias strip provided with an integral inclosed portion forming a sheath at each rim edge.

116. In a tire, tire casing or other tube made up of layers of rubber and textile fabric, the integral combination of a molded open tube of rubber with outer surface of such layer having a larger curve laterally than that of said open rubber tube.

117. In a tire, tire casing or other tube made up of layers of rubber and textile fabric, the integral combination of a molded open tube of rubber-covered fabric with outer surface of such a layer having a larger curve laterally than said open rubber-covered tube.

118. In a tire, tire casing or other tube made up of layers of rubber and textile fabric, the integral combination with such a layer, or layers, of an open tube of rubber-covered fabric molded in the form of a loop having its diameter less than that of said layer or layers.

119. The integral combination of two layers of textile material, the outer surface of each of which is provided with an integral layer of rubber or other elastic substance which was previously made integral with said surface, preferably by vulcanizing, while each textile layer was, while separate, made to assume a cylindrical or other convex curvilineal form.

120. The integral combination, preferably by cement, of two layers of textile material impregnated with rubber vulcanized therewith, the outer surface of each of which is provided with an integral layer of rubber which was previously made integral with said surface while each textile layer was, while separate, molded in a cylindrical or other convex curvilineal form.

121. The integral combination of several layers of textile material, the outer surface of each outer layer provided with an integral layer of rubber, or other elastic substance, which was previously made integral therewith, preferably by vulcanizing, while each of said outer layers was, while separate, made to assume a cylindrical or other curvilineal form.

122. The integral combination of several layers of textile material, the outer layers impregnated with rubber vulcanized therewith, the outer surface of each of which is provided with an integral layer of rubber which was previously made integral with said surface while each of said textile layers was, while separate, molded in a cylindrical or other convex curvilineal form.

123. The integral combination of two layers of the same curvilineal molded form—one of rubber, or other elastic substance, and the other of textile or other suitable flexible material, preferably impregnated with rubber and vulcanized, the convex surface of the rubber layer and the concave surface of the textile layer made to assume reverse curve previous to their integral union by cement, vulcanizing or other suitable integral means, and the resulting compound layer reversed in use.

124. The integral combination of two layers of flexible material, each having a rubber or other elastic surface and both of the same curvilineal molded form, the convex surface of one layer and the concave surface of the other layer made to assume a reverse curve previous to their integral union by cement or such other means as will not disturb the compacted condition of rubber.

125. The integral combination of two layers of textile material, the outer surface of each of which is provided with an integral layer of rubber, or other elastic substance, which was previously made integral with said surface as a convex covering while each textile layer was, while separate, made to assume a cylindrical or other convex curvilineal form, the one layer with its fibers running approximately diagonally with those of the other layer.

126. In curved bands, tubing or other vessels, the integral combination, by cement or other suitable means, of two layers of textile material, wherein rubber or other similar elastic material is made an integral or constituent part, and each layer while separate vulcanized, molded or otherwise permanently held in the desired form—a surface of one layer on a reversal of its curves being made integral with a surface of the other layer.

127. A tube formed by the integral union of lapped edges of a band consisting of a layer of rubber and a layer of textile fabric each, separately or while united, molded in any desired longitudinal form with a ⋂ shaped transverse curve.

128. A tube formed by the integral union of lapped or abutting edges of a band of rubber, textile fabric or other flexible material molded in any desired longitudinal form with a ⋂ shaped transverse curve.

129. An expansible rubber tube formed by the integral union of the edges of a band of rubber molded in any desired longitudinal form with a ⋂ shaped transverse curve, together with a strip of textile fabric made integral along a concave curve to compact the rubber at said portion of surface on a reversal of the curve.

130. In combination with a tire or tire casing of approximately circular interior contour in transverse section and an exterior ⋂ shaped contour at tread, a detachable tread-band provided with a ⋂ shaped longitudinal tongue occupying the groove, and lateral wings adapted to hug the sides of tire.

131. A detachable tread-band, of rubber or other suitable flexible material, provided with laterally extending wings and a ⋂ shaped inwardly projecting longitudinal tongue, and a lining of one or more layers of textile material made integral with its inner surface.

132. In combination with the outer surface of a tire or pneumatic tire cover, a band approximately transversely circular, of one or more layers of textile fabric, open along rim circumference, provided with a ⋂ shaped recurved longitudinal recess at tread portion sunk in the elastic covering of its outer tread surface.

133. In a tire or tire casing, the combination of a tubular textile band, of approximate circular transverse outline, provided with a layer of rubber forming the inner surface of tire and a textile band, of one or more layers, provided with a ⋂ shaped longitudinal recess sunk in its tread portion.

134. A tread-recess-band consisting of one or more layers of textile fabric, of approximate circular transverse inner contour, open at rim, provided with a longitudinal ⋂ shaped groove sunk in the elastic, or other flexible, covering of its outer tread surface.

135. The combination of a tire casing, tube or other vessel, of non-expansible material, with a puncture-closing lining consisting of a layer or layers of textile fabric having an integral inner surface layer of rubber compacted by reversing the positions of fabric and rubber by turning the lining after molding it to the form of the inner surface of vessel to be lined, and prior to its integral union with said vessel.

136. In a tube, of any longitudinal form, the combination of a tube of textile material with a compacted inner surface lining of rubber, made integral with said surface as an outer covering previous to turning said textile tube inside out, and a reinforcing layer or layers of textile or other flexible non-expansible material integrally covering its outer surface.

137. In a tube of any desired longitudinal form, the combination of a textile tube with an integral lining of compacted rubber and a reinforcing integral outer covering of textile or other suitable non-expansible material.

138. In a tire-casing, tube, or other vessel, the integral combination of two or more layers of rubber lined fabric, the rubber lining of each layer being compacted by its integral union with outer surface of textile layer previous to a reversal of layer and the layers made integral, as reversed and alternating with said compacted rubber layers, by cement or other suitable means.

139. In combination with a free ended tube of textile or other non-expansible fabric of any desired longitudinal form, an inner lining tube of textile fabric provided with an integral inner layer of compacted rubber; said inner textile lining tube made integral with outer textile tube at each end by cement, vulcanizing or other suitable means.

140. In combination with a free-ended rubber lined tube of textile or other non-expansible fabric, of any desired longitudinal form, an inner lining tube of textile fabric provided with an integral inner layer of compacted rubber; said inner textile lining tube made integral with outer textile tube at each end by cement, vulcanizing or other suitable means.

141. In a free ended tire or pneumatic tire casing, of annular or loop form, or section thereof, the combination of an approximately circular interior contour in transverse section, and an exterior recurved contour at tread; said recurved contour at tread being produced by a ⋂ shaped recurved recess sunk in the material of tire, casing or section extending longitudinally or annularly around the tread circumference, substantially as shown.

142. A pneumatic tire or other tube formed by the union of the ends of a single tube or of sections of a tube made up of layers of textile fabric and rubber integrally united by cement or vulcanizing and of a molded loop form whose periphery at rim does not increase with that of the completed tire.

143. In combination with one or more layers of textile or other non-expansible fabric provided with an integral layer of compacted rubber on one surface, a layer of rubber on the other surface which had been subjected to vulcanization (or a state of partial fusion) and allowed to set while integral with said fabric as an outer surface covering when said fabric with said compacted lining layer of rubber was held in a cylindrical or other convex curve, in such manner as not to interfere with the compacted conditions of first mentioned rubber layer.

HENRY CLIFTON SHEARMAN.

Witnesses:
BENJAMIN BAKER,
NATHANIEL S. BISHOP.